United States Patent
Russell (10) Patent No.: US 7,542,763 B2
(45) Date of Patent: *Jun. 2, 2009

(54) PROVISIONING OF WIRELESS PRIVATE ACCESS SUBSCRIBERS FOR LOCATION BASED SERVICES

(75) Inventor: Alicia Marie Russell, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/551,964

(22) Filed: Oct. 23, 2006

(65) Prior Publication Data

US 2007/0049293 A1 Mar. 1, 2007

Related U.S. Application Data

(63) Continuation of application No. 10/629,807, filed on Jul. 30, 2003, now Pat. No. 7,146,153.

(51) Int. Cl.
*H04Q 7/20* (2006.01)

(52) U.S. Cl. .............. 455/423; 455/67.14; 455/404.2; 455/456.1; 455/554.1; 455/67.11; 379/2; 379/14.01; 379/15.05; 379/22.03

(58) Field of Classification Search .............. 455/456.1, 455/456.2, 456.3, 457, 404.2, 404.1, 456.5, 455/456.6, 8, 13.4, 423, 424, 67.11, 67.14, 455/554.1, 403
See application file for complete search history.

(56) References Cited

U.S. PATENT DOCUMENTS

| | | | |
|---|---|---|---|
| 5,155,762 A * | 10/1992 | Croquet et al. | 379/92.04 |
| 5,983,098 A | 11/1999 | Gerszberg et al. | |
| 6,216,000 B1 | 4/2001 | Blumhardt | |
| 6,349,203 B1 * | 2/2002 | Asaoka et al. | 455/414.3 |
| 6,359,880 B1 | 3/2002 | Curry et al. | |
| 6,393,271 B1 | 5/2002 | Dougherty | |
| 6,453,153 B1 | 9/2002 | Bowker et al. | |
| 6,539,237 B1 | 3/2003 | Sayers et al. | |
| 6,546,244 B1 | 4/2003 | Yoder et al. | |
| 6,697,630 B1 | 2/2004 | Corwith | |
| 6,999,568 B1 * | 2/2006 | Miyahara | 379/142.15 |
| 7,039,434 B1 * | 5/2006 | Matsumoto | 455/517 |
| 7,146,153 B2 * | 12/2006 | Russell | 455/404.2 |
| 7,180,898 B2 * | 2/2007 | Yoshida et al. | 370/395.3 |
| 2001/0011010 A1 * | 8/2001 | Takekawa et al. | 455/67.1 |
| 2002/0142763 A1 | 10/2002 | Kolsky | |
| 2002/0181685 A1 | 12/2002 | Doherty et al. | |
| 2003/0007473 A1 * | 1/2003 | Strong et al. | 370/338 |
| 2004/0185876 A1 * | 9/2004 | Groenendaal et al. | 455/456.5 |
| 2004/0192211 A1 | 9/2004 | Gallagher et al. | |
| 2004/0203874 A1 * | 10/2004 | Brandt et al. | 455/456.1 |
| 2004/0203914 A1 | 10/2004 | Kall et al. | |
| 2004/0242230 A1 | 12/2004 | Rue | |
| 2004/0259541 A1 | 12/2004 | Hicks et al. | |
| 2005/0002346 A1 | 1/2005 | Bichot | |
| 2005/0037775 A1 | 2/2005 | Moeglein et al. | |

* cited by examiner

*Primary Examiner*—Huy Q Phan
(74) *Attorney, Agent, or Firm*—Greenblum & Bernstein, P.L.C.

(57) ABSTRACT

A private wireless network access point is associated with a predetermined telephone number corresponding to a physical location. The associated predetermined telephone number is included with call setup information when a wireless terminal in a private wireless network communicates via the access point so that a location of the wireless terminal can be determined based on the predetermined telephone number.

1 Claim, 6 Drawing Sheets

PROVISIONING OF WIRELESS PRIVATE ACCESS SUBSCRIBERS FOR LOCATION BASED SERVICES

CROSS-REFERENCE TO RELATED APPLICATION

The present application is a continuation application of pending U.S. patent application Ser. No. 10/629,807, filed on Jul. 30, 2003, the content of which is expressly incorporated by reference herein in its entirety.

BACKGROUND OF THE INVENTION

1. Field of the Invention

The present invention relates to the field of telecommunications. More particularly, the present invention relates to provisioning location based services to subscribers that operate in private wireless networks.

2. Background and Material Information

The use of mobile communication devices, such as mobile phones, personal digital assistants, and other wireless devices, generically referred to herein as mobile terminals, are increasing in use and popularity. This use has traditionally been with the public land mobile networks, however, the use of private wireless networks is also growing. The use of such private wireless networks can replace or enhance the traditional use of telephone service at a customer's premises.

Also gaining in popularity and use are certain telephone services provided by telecommunication companies, such as local exchange carriers, that have features that are dependent on knowing the location of the telephone caller However, a subscriber using a private wireless network may not have the ability to fully use such telecommunications service features that require a subscriber's location. This is because traditional wireless services used in conjunction with the public land mobile network do not provide the subscriber's location as the customer premises' location.

The present invention overcomes the problem with the inability of telecommunication service features to dynamically associate a particular phone call from a subscriber with the subscriber's premises location.

DESCRIPTION OF THE DRAWINGS

The present invention is further described in the detailed description that follows, by reference to the noted drawings by way of non-limiting, examples of embodiments of the present invention, in which like reference numerals represent similar parts throughout the several views of the drawings.

DETAILED DESCRIPTION OF THE INVENTION

The present invention overcomes the inability of telecommunications companies to locate subscribers calling from a private wireless network that uses existing landline networks for backhaul but not necessarily for switching and call control. This is accomplished by associating subscriber calls placed in a private wireless network with an ITU-T E.164 telephone number associated with the physical transport facility at the customer location and with the customer through a provisioning procedure.

As an example, consider an 802.11 Wi-Fi (wireless fidelity) access point that connects to a remote service provider for voice over IP (VoIP) and data services via a telecommunications network. In particular, the 802.11 access point connects to the telecommunications network via an asynchronous digital subscriber line (ADSL) modem connected to a copper twisted pair that has been provisioned with a telephone number. The customer is billed by the telecommunications service provider using the telephone number as an identifier. The telecommunications service provider also has a database that stores the address of the physical termination of the copper pair associated with this telephone number.

In view of the above, the present invention through one or more of its various aspects and/or embodiments is presented to accomplish one or more objectives and advantages, such as those noted below.

According to an aspect of the invention, a network includes a private wireless network access point, and a network element that associates a telephone number with a call from the access point. The access point may include a transceiver, a voice and data connection, a disconnection detector, and an identification address. The access point may also include a detector that detects when the access point has been disconnected from the voice and data connection and/or power supply, In one embodiment, the network element is a softswitch, which may include a router and/or a gateway, and a database. The database stores the telephone number and an access point identification. In another embodiment, the network element is an access point controller, which may include a router and/or a gateway, and a database that stores the telephone number and an access point identification.

The network may also include a mobile terminal that only accesses the private wireless network, and/or a mobile terminal that accesses the private wireless network and a public land mobile network.

According to another aspect, method of originating a call from a terminal within a private wireless network includes associating a telephone number with the call based upon an access point ID of an access point interfacing with the terminal. The method may also include determining whether the access point of the private wireless network is still located at a subscriber's premises by contacting the access point. In one embodiment, the call is an emergency call. The method may also include appending the telephone number to call setup signaling information.

In one embodiment, the private wireless network includes an access point having a transceiver that uses either Bluetooth or Wi-Fi technology. The method may also include determining when the access point loses a power, or a voice and data connection; and changing a status to PENDING when it is determined that the access point lost one of the connections. The method may further include returning the status to ACTIVE when it is confirmed that the access point has not been removed from a location. The confirmation can include comparing an access point ID received from the access point, in response to a test call, with a stored access point ID.

The method may include prompting a subscriber to provide an identification of the access point and a telephone number, and may also include storing the identification of the access point and the telephone number.

In another aspect of the present invention, a call setup signal propagated on a propagation medium is provided. The signal includes call setup signaling information including telephone number data for a phone call originating from a private wireless network. The telephone number data is determined based upon an access point ID of an access point associated with the call.

Figure 1:
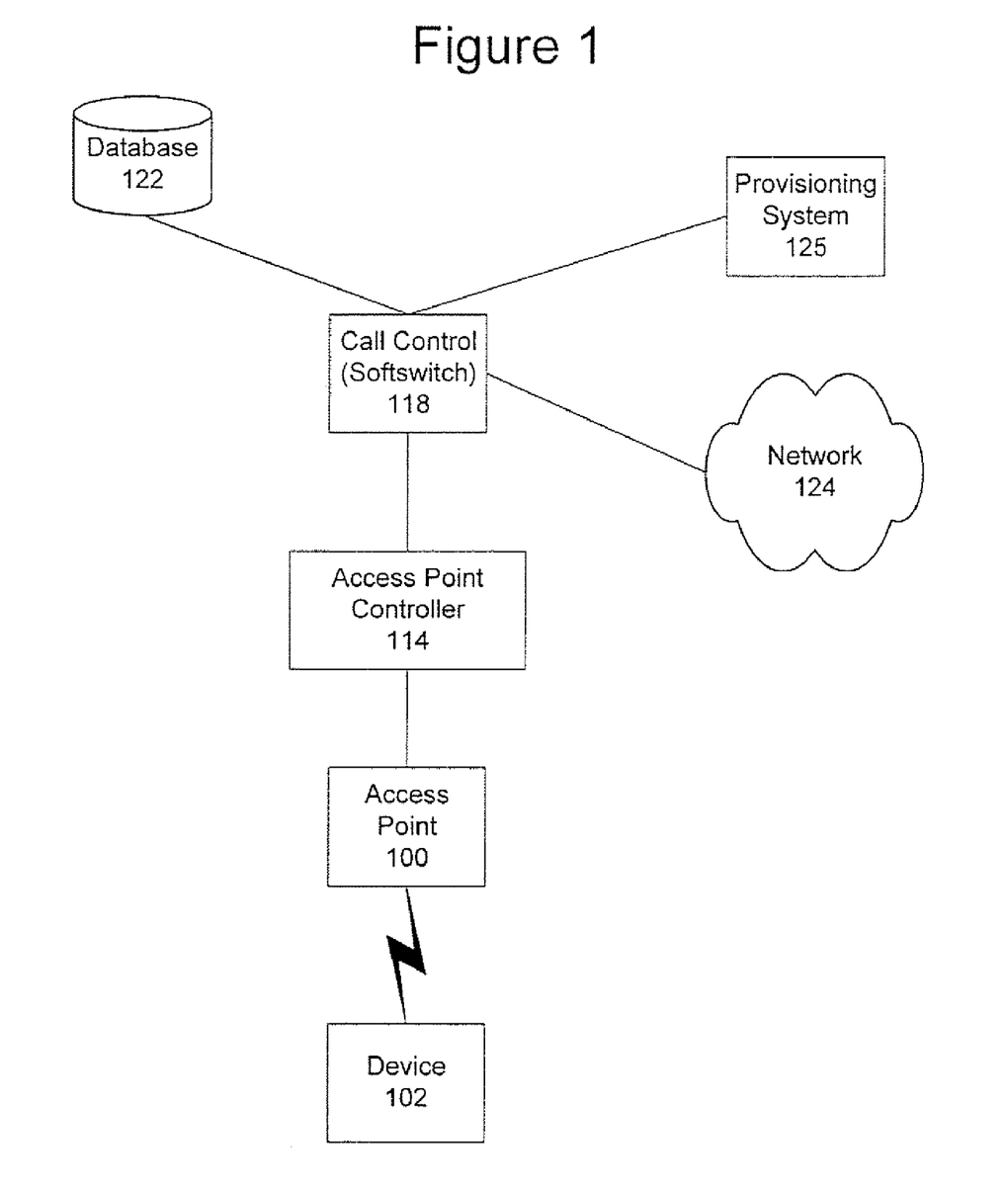
FIG. 1 illustrates a generic system architecture, according to an aspect of the present invention.

Referring to FIG. 1, a private wireless network allows a subscriber to have wireless connectivity in a limited area, such as their premises (business or home). The private wireless network includes an access point 100 that provides a communication link for a mobile terminal 102, within the private wireless network, to a transport network 124. The transport network 124 can include one or more of the following: a public switched telephone network (PSTN), a packet data network, and a public land mobile network (PLMN). For example, the access point 100 can link the mobile terminal 102 to the public switched telephone network 124 for voice and to the packet data network 124 for call set up, tear-down, and any other control signaling.

The private wireless network also includes an access point controller 114 that operates in conjunction with the access point 100 for implementation of the private network. The access point controller 114 is a logical network entity. Physically it may be implemented as a stand alone platform, as functionality in a broadband remote access service (B-RAS) or Multi-Services Gateway, as functionality in a wireless base station controller, switching GPRS support node, or gateway GPRS support node, or it may be combined with an individual access point 100.

The transceiver associated with the access point 100 can employ any known wireless technology to transmit data and voice between the mobile terminal 102 and the access point 100. For example, the transceiver can use a wireless technology, such as Bluetooth, Wi-Fi (802.11), fixed wireless access (IEEE 802.16 and other implementations), or any other known technology using a licensed or unlicensed frequency band.

As a specific example, the access point 100 includes a transceiver and the mobile terminal 102 uses Wi-Fi technology to transmit both voice and data between the access point 100 and the mobile terminal 102. There are presently at least three types of Wi-Fi standards including IEEE 802.11b, IEEE 802.11a, and IEEE 802.11g. In one embodiment, the access point 100 uses IEEE 802.1 g (or any future advancement thereof) as the protocol for voice and data transmission. However, it should be noted that any wireless technology capable of transmitting voice and/or data is within the spirit and scope of the present invention.

The access point 100 may her include a power connection to provide power to the access point 100. The access point 100 also includes an interface to a voice and data connection to connect to the transport network 124. The interfaces for voice and data may be distinct or there may be a single interface, For example, in an ADSL transport implementation, the voice and data traffic may be carried over distinct ATM permanent virtual circuits.

Furthermore, the access point 100 needs to be able to positively distinguish itself from other access points. This can be accomplished with an identification, such as a specific hardware address that is unique to this access point 100. As an example, the hardware address can be a Media Access Control (MAC) address. The MAC address is a hardware address that uniquely identifies each device as a node of a network. However, it should be understood that it would be within the spirit and scope of the present invention to use any known type of identification method for identification of the access point 100 to the private wireless network.

The access point 100 of the present invention can also include a feature that detects when the access point 100 has been disconnected from either the access point power source or the voice and data connection. One of the purposes for determining whether a connection has been lost is to increase the likelihood of detecting when the access point 100 is moved to another premises. In this regard, a new premise may require the association of a new telephone number of the new premises in order for the access point 100 to properly provide information to obtain location dependent telecommunication services.

In one embodiment, the access point 100 includes a software routine that activates each time the access point 100 is powered-up to verify the telephone number of the premises on which it is located. This process is described in more detail below. Additionally or alternatively, the access point 100 may be able to detect when it has lost the voice and data connection. This loss of the voice and data connection may also be indicative of a possible chance of premises for the access point 100. Again, a software routine may be implemented to periodically check the voice and data connection to ensure that it is connected. As a specific example, the access point 100 will periodically determine if there is a dial tone from the voice and data connection for POTS service. In the DSL case, the access point 100 or access point controller 114 would send a ping. It should be understood that any device or configuration that detects that the access point 100 has been disconnected and/or moved from the premises is within the spirit and scope of the present invention.

Next, the mobile terminal 102 used in conjunction with the present invention will be described. The mobile terminal 102 has the capability to receive wireless services with the public land mobile network when outside the private wireless network and to receive wireless service from the private wireless network when within the private wireless network. For example, the mobile terminal 102 can be a dual mode device. In this way, the mobile terminal 102 operates and functions like any other mobile device when operating in the public land mobile network. Various air-interface technologies (e.g., TDMA, CDNA, PACS, GSM, IDEN, and PCS-1900) may be utilized to facilitate communications between the mobile terminal 102 and cell sites of the public land mobile network. Each of the cell sites may include, for example, a radio transceiver and may be connected by landlines or other communication links to Mobile Switching Centers (MSCs) or Mobile Telephone Switching Offices (MTSOs). When the mobile terminal 102 is in the private wireless network, it operates to connect through the access point 100 of the private wireless network.

Alternatively, the mobile terminal 102 may only be able to connect to the private wireless network. For example, the mobile terminal 102 may be a cordless Wi-Fi device. It should be noted that the above description of the mobile terminal 102 should not be limited to this particular embodiment. Any mobile terminal that is capable of connecting to a private wireless network and possibly the public land mobile network is within the scope and spirit of the present invention.

The access point 100 can transmit voice, call signaling (i.e. call set up, call tear-down, registration, authentication), and any other type of data. The transmission of the voice and/or data is through the voice and data connection, which can take the form of a plain old telephone service (POTS) connection, and/or broadband connection (implemented, for example, by a cable modem or DSL).

In one embodiment, the voice and data connection of the present invention can transmit voice data (bearer traffic) over a POTS connection and transmit call signaling and any other type of data over a broadband connection. Alternatively, the voice and data connection of the present invention can transmit voice data (bearer traffic) over a POTS connection and can also transmit call signaling and any other type of data over a POTS connection (using single or multiple lines). In another embodiment, the voice and data connection of the present invention can transmit voice data (bearer traffic) over a broadband connection (ice. Voice over IP (VoIP)) and can also transmit call signaling and any other type of data over a broadband connection.

Next, a softswitch 118 will be described in more detail. Although the following functions are described for the softswitch 118, some of the functions may alternatively be provided in an access point controller 114. The softswitch 118 provides support and implementation of the access point 100 and the private wireless network for its setup, operation, and maintenance. Generally, softswitch 118 provides subscriber customer provisioning, supports gateway functions to the transport network 124, and may have some features of a class 5 switch. The specific implementation of each of these features will be discussed in more detail below.

The softswitch 118 includes (or communicates with) a database 122 that associates the telephone number of a subscriber with the identification of the subscriber's access point 100. This database 122 can be implemented as a server but can also be implemented together with the softswitch 118.

The softswitch 118 can provide additional support features for the private wireless network and the access point 100, as needed. The softswitch 118 can also include connections to the transport network 124. As a specific example, the softswitch 118 can be, for example, a serving GPRS support node (SGSN) or gateway GPRS support node (GGSN). A provisioning system 125 can also be provided. The provisioning system 125 can be used to provision the softswitch 118, as described below.

Figure 2:
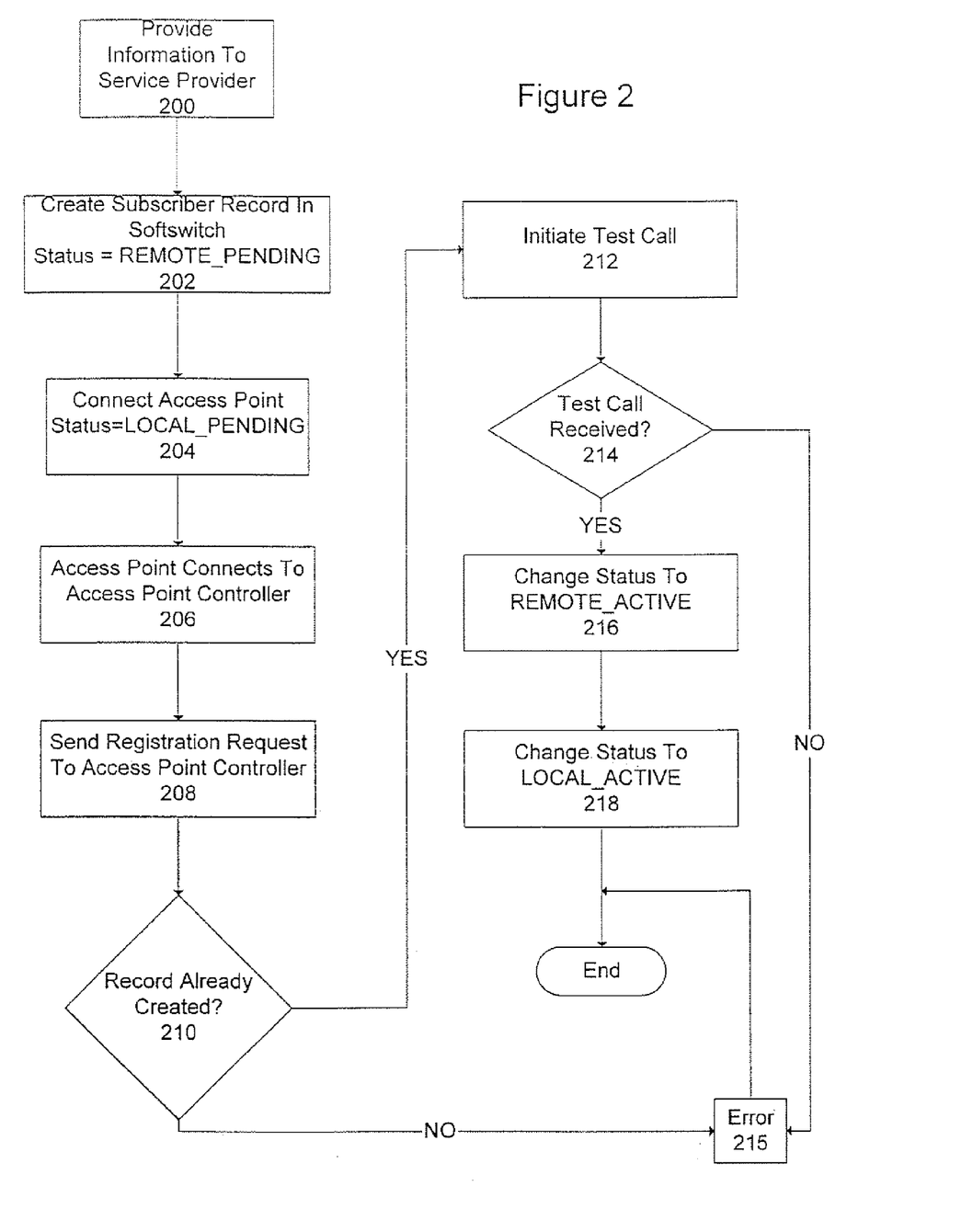
FIG. 2 is a flow diagram of exemplary provisioning processes and operations, according to an aspect of the present invention.

Next, a provisioning process for the private wireless network and the access point 100 will be discussed with reference to FIG. 2. In the following discussion, it is assumed that the subscriber wishes to add telephony service over a private wireless network interface. For example, the subscriber may want to activate VoIP and related telephony services for Wi-Fi over a DSL connection. Voice telephony, by its nature, may take place at any time. Therefore, the communications path should be available at any time, i.e., it should be an always-on connection. As such, a dial-up modem connection is not really suitable. Therefore, the present example is described with respect to broadband connections and in particular, DSL as the transport service technology.

After a subscriber has procured an access point 100 to establish a private wireless network for use in the subscriber's premises, activated the telephony transport, e.g., DSL, and obtained a telephone number, at step 200, the subscriber contacts the service provider. He may contact the service provider via one of several methods (e.g., connecting to a web server, telephony interactive voice response (IVR), or speaking with a customer representative). During this interaction, the subscriber provides his name, address, telephone number, and access point ID (e.g., as it appears on the device or in attached customer documentation).

The customer provisioning system 125 collects this information and several actions may now take place (e.g., updating billing records). One of these actions is sending a message to the appropriate softswitch 118 with information for a new subscriber record, which occurs at step 202. Key parameters forwarded to the softswitch 118 include the telephone number and access point ID. This information is stored in a new subscriber record with a status of REMOTE_PENDING until the actual access point activation takes place and the telephone number is verified. REMOTE_PENDING signifies that activation is pending from the network.

At some later time the subscriber connects the access point to the voice/data communications interface and possibly to a power source (step 204). At this time, the access point activation may begin. The activation process initially sets the access point status to LOCAL_PENDING. At step 206, the access point 100 connects to the access point controller 114. The access point 100 may use Point-to-Point Protocol (PPP), PPPoE (PPP over Ethernet), DHCP, or some other method to determine the address of the access point controller 114 and connect to it. In one embodiment, the access point 100 is pre-configured to establish a PPP tunnel to the access point controller 114. In another, it uses the access point controller host name to query a DNS server and obtain the IP address of the access point controller 114.

At step 208, the access point 100 sends a Registration Request message to the access point controller 114 that includes its access point ID and possibly other information. The protocol used for this message exchange is not specified, and may be proprietary. The access point controller 114 then forwards the request to the appropriate softswitch 118. The appropriate softswitch 118 is the switch that will handle originating and terminating calls for users within the given access point 100.

At step 210, the softswitch 118 consults the telephone number to access point ID database 122 to see if a record has been created for the given access point ID. If no record has been created, an error occurs at step 215 and then the process ends. The status of the service at the access point 100 and at the softswitch 118 remains pending. Error treatment may be conveyed to the subscriber using a variety of methods. If the softswitch 118 finds a record with this access point ID (step 210:YES), at step 212 the softswitch 118 initiates a test call to the access point 100 with the telephone number provided by the subscriber. If the access point 100 receives the test call (which is terminated on the access point 100 and not forwarded to the subscriber terminal 102) it provides a successful response to the access point controller 114 (214:YES), which forwards the response to the softswitch 118. The softswitch 118 changes the subscriber status to REMOTE_ACTIVE, and responds to the Registration Request with a successful return result that causes the access point 100 to change its status to LOCAL_ACTIVE.

As a specific example, the softswitch 118 can dial the telephone number of the subscriber's premises The access point 100 then recognizes that the softswitch 118 is requesting identification and provides softswitch 118 with the identification of the access point 100.

If, on the other hand, the access point controller 114 is unable to connect to the access point 100 or the identification is incorrect (step 214:NO), the access point controller 114 assumes the call was sent to the wrong number, an error occurs at step 215, and the process ends. Accordingly, the record status remains as REMOTE_PENDING. The softswitch 118 replies to the Registration Request with a return result indicating failure. Thus, the access point status also remains at LOCAL_PENDING. When the status is PEND- ING, normal calls cannot be placed from the access point 100. In one embodiment, however, emergency calls, e.g., to 911, are always processed, regardless of whether the status is PENDING. After the error occurs at step 215, the subscriber can attempt the provisioning process starting at step 200.

If the test call is received and the proper information is received from the access point 100 (step 214:YES), the softswitch 118 then changes the status of the access point 100 in its repository from REMOTE_PENDING to REMOTE_ACTIVE, and sends an acknowledgement in the Registration Request return result to the access point 100 at step 216. Upon receipt of the message with REMOTE_ACTIVE, the access point 100 internally changes its status to LOCAL_ACTIVE at step 218. Users within the access point 100 coverage area can now originate and receive calls over the wireless private network.

In the process described above, the access point controller 114 acts only as a bypass element. It is possible, however, for the access point controller 114 to perform the functions specified for the softswitch 118 (e.g., database update and test call initiation/termination).

Of course the provisioning process may include other activation processes and steps. It should be understood that these processes could take place before, during, and/or after the above-described process. The processes can include any additional interactions that are required in order for the access point 100, the private wireless network, and the transport network 124 to properly operate. Such additional processes are within the scope and spirit of the present invention.

Figure 3:
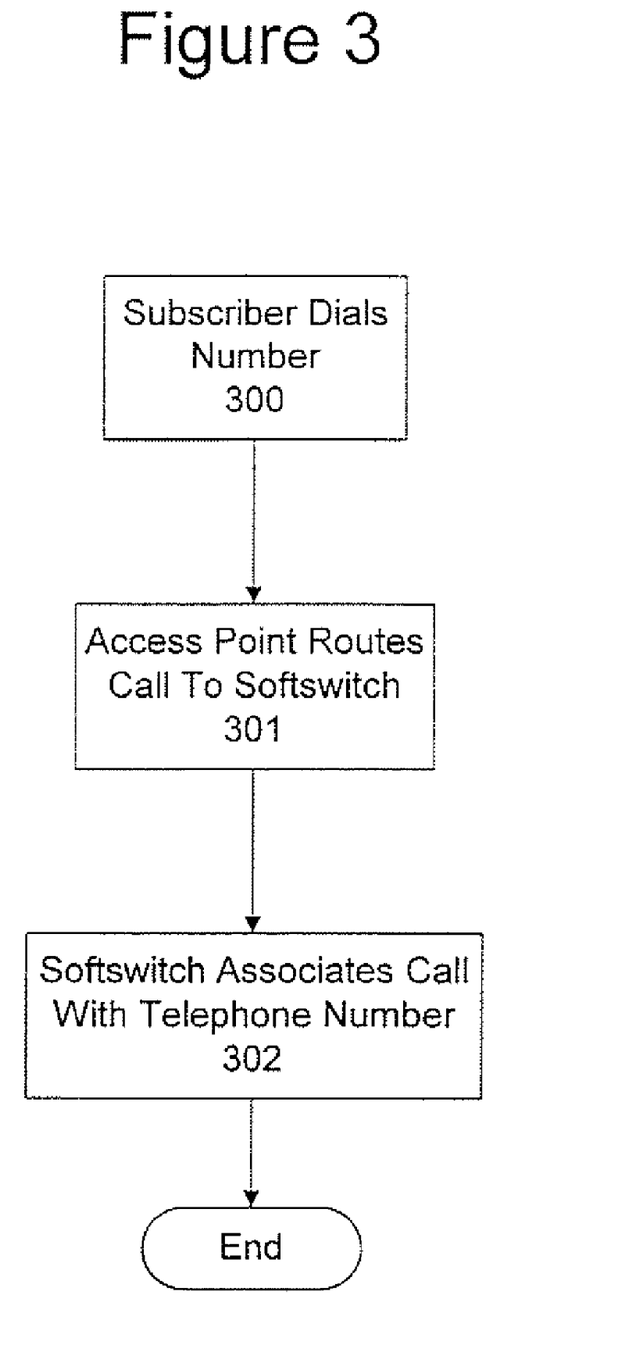
FIG. 3 is a flow diagram of exemplary processes and operations of an operational aspect of the present invention.

Next, a call that uses a telecommunications service requiring location information will be explained with reference to the flow diagram of FIG. 3. It should be noted that every call could use the below-described process. However, in the following example the process is only applied during a call associated with a location based service number, for example 911.

In step 300, the subscriber uses the mobile terminal 102 to originate a call from a telephone connected through the private wireless network. Next, in step 301, the access point 100 routes the call through the access point controller 114 to the softswitch 118. In this process, the access point 100 delivers the access point identification to the softswitch 118.

Next in step 302, the softswitch 118 queries the database 122 to obtain the associated telephone number. The softswitch 118 then appends the telephone number to the call setup signaling information in the field for the calling party telephone number. This association allows the called party to receive ANI information associated with the telephone number. The softswitch 118 next routes the call through a gateway to the PSTN 124. In the case of a 911 emergency call, the call is routed to a 911 tandem or to a central office switch that handles 911 calls. A telephone company database is then used to map the telephone number to the street address where the access point 100 has been installed.

The desire to know the location of the access point is Generally attributed to the regulatory need to provide location for emergency telephony service. Consequently, while it would be important to keep updated the location of the access point 100 for voice services, if the access point 100 is being used strictly for data service this feature may be optional. The activation or de-activation of this feature may be dictated by a subscription profile (similar to Home Location Register) that informs the access point controller 114 whether location is required. Furthermore, in the case of an emergency, it is important to be able to enable the subscriber to initiate an emergency call even if the access point is in a LOCAL_PENDING state and a REMOTE_PENDING state because it is assumed that it is preferable to allow the call to go through, even if location information is not provided automatically.

Figure 4:
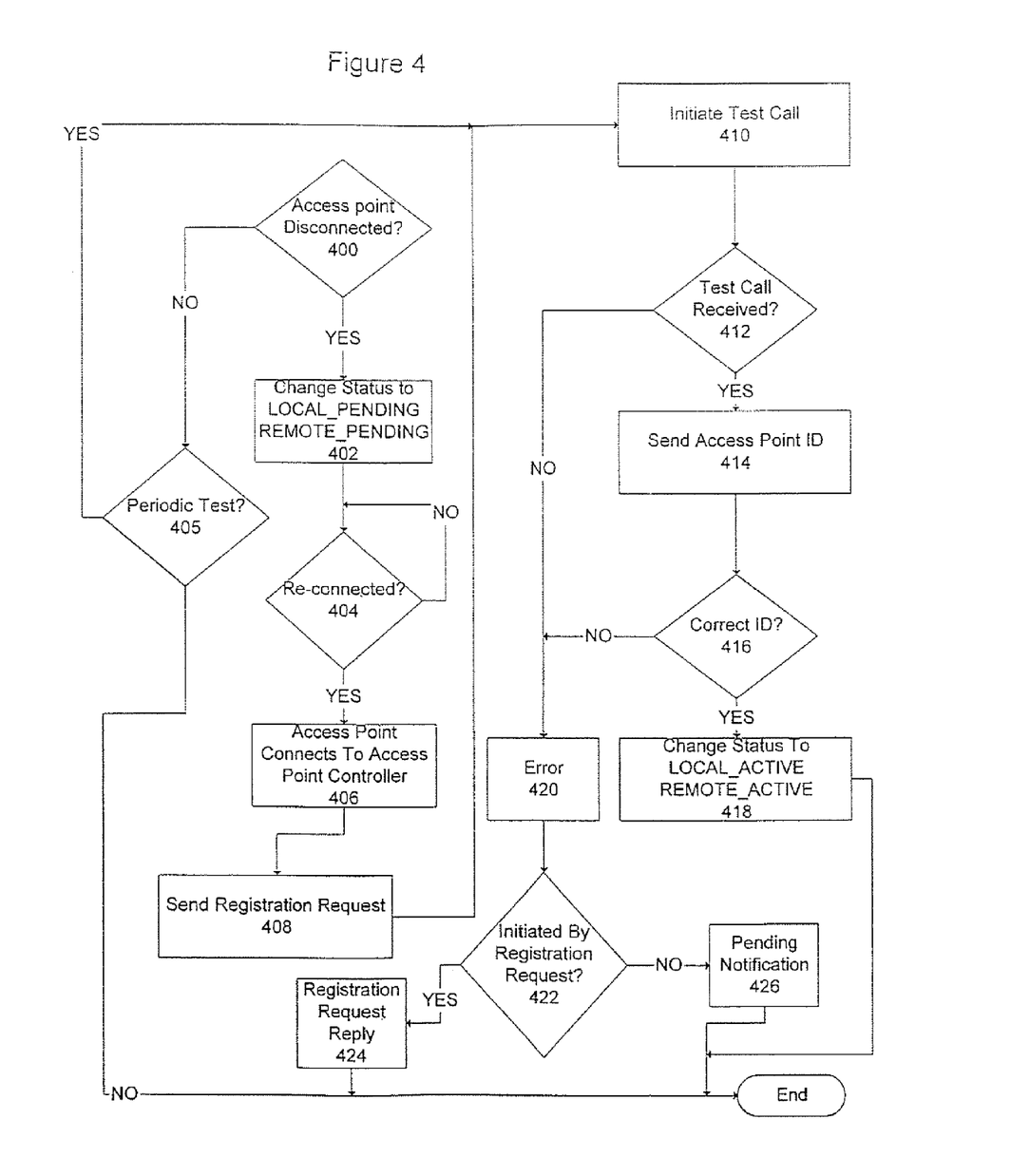
FIG. 4 is a flow diagram of exemplary processes and operations of a maintenance aspect of the present invention.

Next, one of the maintenance operations of the private wireless network will be explained with reference to the flow diagram of FIG. 4.

To ensure the correct provisioning of telecommunication services that require a location, such as emergency services, the softswitch 118 will have to ensure that the correct telephone number is associated with the access point 100. More specifically, the softswitch 118 confirms that the access point 100 is located at the premises associated with the telephone number. If the access point 100 has been disconnected (step 400:YES), it can request a test call from the softswitch 118 to verify the location. If the access point 100 is disconnected from the voice/data connection/termination and/or powered down, at step 402 a software process in the access point 100 changes its status from LOCAL_ACTIVE to LOCAL_PENDING. When the softswitch 118 becomes aware of the lost connection, it changes the status in its repository to REMOTE_PENDING.

At step 404, the access point 100 awaits reconnection. When the access point 100 is re-connected or powered up (the status is still LOCAL_PENDING) (step 404:YES), the access point 100 connects to the access point controller 114 at step 406. Subsequently, at 408 the access point 100 initiates a Registration Request to the access point controller 114, which the access point controller 114 forwards to the softswitch 118.

If the access point has not been disconnected (step 400: NO), it is determined whether it is time for the softswitch 118 to periodically test call the telephone number and connect to the access point 100 to verify the location. When no verification is needed (405:NO), the maintenance process ends.

If it is time for a periodic test (step 405:NO), or after step 408 completes, the softswitch 118 initiates a test call at step 410. If the call is successful (step 412:YES), the access point 100 recognizes that the softswitch 118 is requesting identification and replies to the softswitch 118 with the identification of the access point 100 at step 414. At step 416 the softswitch 118 determines whether the access point ID matches the information in the database 122. If there is a match (step 416:YES), then the softswitch 118 concludes that the access point 100 has not been removed from its original location. A successful reply by the softswitch 118 to the access point Registration Request query prompts the access point 100 to change the status to LOCAL_ACTIVE, if necessary, and the softswitch 118 to change the status to REMOTE_ACTIVE, if necessary, at step 418. Consequently, the subscriber may resume its use for telephony service.

If, on the other hand, the soft switch 118 is unable to connect to the access point 100 or the identification is incorrect (step 412:NO, step 416:NO), the soft switch 118 will no longer process normal calls. That is, an error occurs at step 420. Subsequently, it is determined whether the test call was initiated by a Registration Request at step 422. If so, a Registration Request reply is sent to notify the access point 100 of the failure. If the test call was not initiated by a Registration Request, the softswitch 118 initiates a Pending Notification to the access point 100, notifying the access point 100 of the failure. After steps 424 and 426 the process ends. If desired, the subscriber can return to the provisioning process shown in FIG. 2.

In the process described above, the access point controller 114 again acts only as a bypass element. It is possible, however, for the access point controller 114 to perform the functions specified for the softswitch 118.

Figure 5:
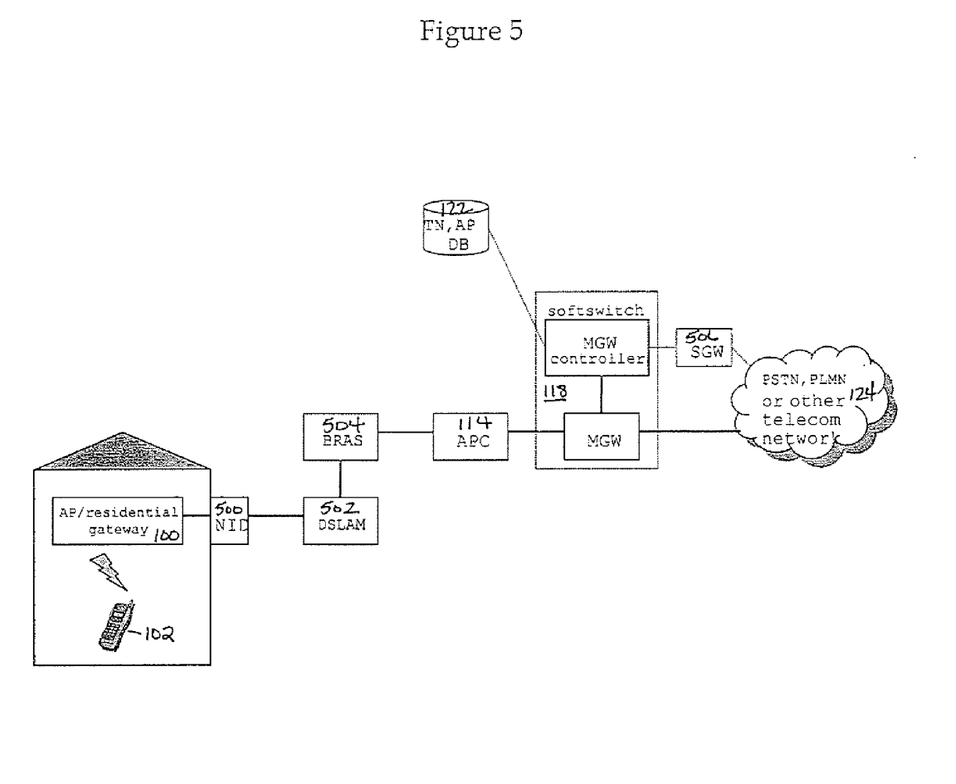
FIG. 5 illustrates an exemplary architecture for a residential DSL implementation, according to an aspect of the present invention.

A system architecture for a residential DSL implementation is now described with reference to FIG. 5. A device 102 communicates with an access point 100, both of which are located at the subscriber's premises. The access point may also be a residential gateway, which is an integrated device including the access point 100 and a DSL modem. The integrated device may also include a firewall. The access point/ residential gateway 100 connects via a network interface device 500 to a DSLAM 502, which communicates with a B-RAS 504. The B-RAS 504 connects via an access point controller 114 to a softswitch 118. In this embodiment, the softswitch 118 includes a media gateway (MGW) and an MGW controller. The media gateway and media gateway controller convert bearer traffic in an IP network to a format compatible with a circuit switched network 124. Similar to FIG. 1, the softswitch 118 communicates with a database 122 and a telecommunications network 124. The softswitch 118 also connects to a signaling gateway (SGW) 506, which mediates between signaling in an IP network and a circuit switched network 124.

Figure 6:
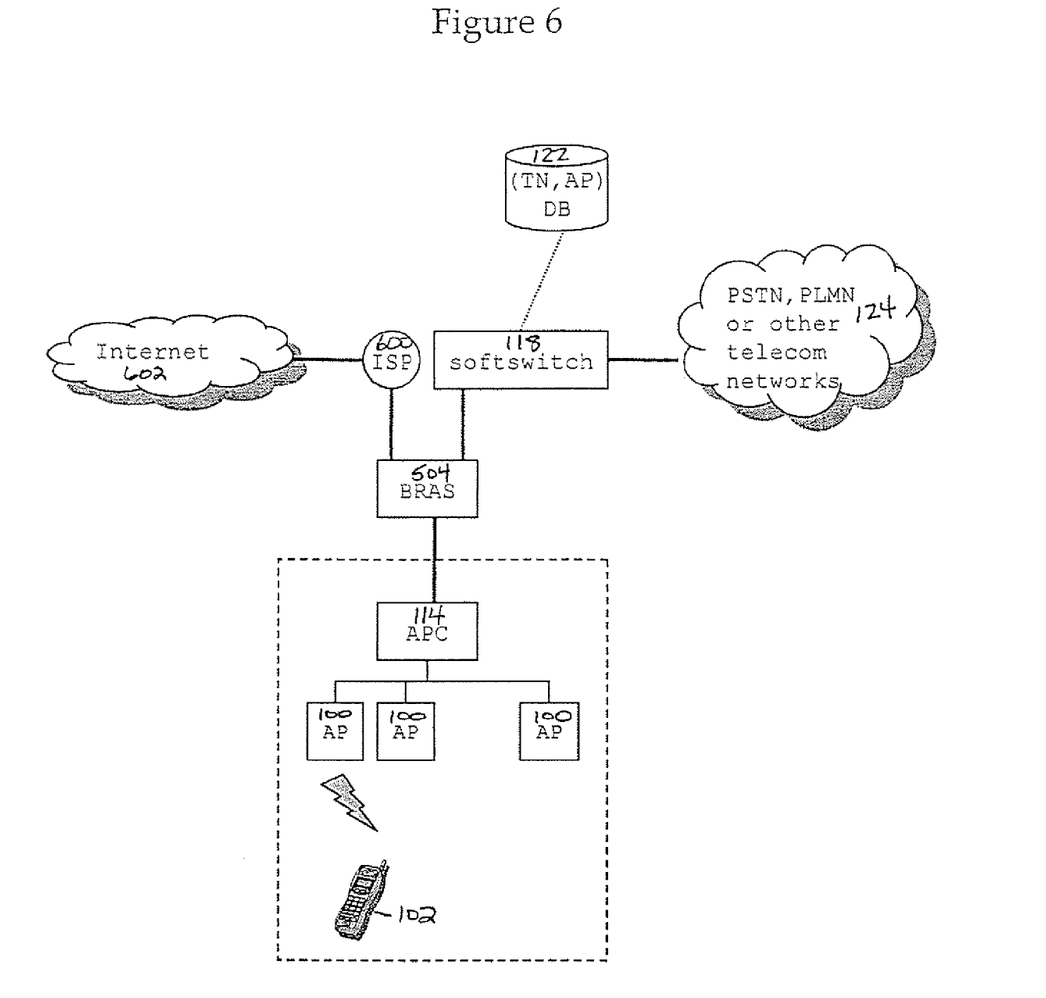
FIG. 6 illustrates an exemplary architecture for a DSL based public wireless hotspot, according to an aspect of the present invention.

Referring to FIG. 6, a DSL based public wireless hotspot architecture is now described. In this embodiment, multiple access points 100 are provided within a location where wireless service is offered, for example, an airport. Each of the access points 100 communicates directly with an access point controller 114, which also resides locally where service is offered. The mobile device 102 can wirelessly communicate with any of the access points 100. The access point controller 114 is connected to a B-RAS 504, which connects to an internet service provider 600 and a softswitch 118. The internet service provider 600, of course, connects to the internet 602. The softswitch 118, as before, connects to the network 124 and the database 122.

The present invention overcomes the inability of telecommunications companies to determine the location of a subscriber originating calls from a private wireless network. As noted above, this is accomplished by associating the ID of the access point 100, which the subscriber is placing calls through, with a telephone number of the premises where the access point 100 is installed.

In accordance with various embodiments of the present invention, the methods described herein are intended for operation as software programs running, on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk (e.g. compact disc (CD), Digital Video Disk (DVD)); or a solid state medium such as a memory card or other package that houses one or more read-only (non-volatile) memories, random access memories, or other re-writable (volatile) memories. Accordingly, the invention is considered to include a tangible storage medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for air interfaces and network transmissions represents an example of the state of the art. Such standards are periodically superseded by faster or more efficient equivalents having essentially the same functions. Accordingly, replacement standards and protocols having the same functions are considered equivalents. Additionally, the described and depicted links and connections do not necessarily indicate point-to-point connections. These connections are merely exemplary and it is with the scope of this invention to use any arrangement of connections.

What is claimed:

1. A private wireless network access point associated with a predetermined telephone number corresponding to a physical location, the associated predetermined telephone number being included with call setup information when a wireless terminal in a private wireless network communicates via the access point so that a location of the wireless terminal can be determined based on the predetermined telephone number;
   the network access point including a detector that detects when the access point has been disconnected from at least one of a voice and data connection and a power supply;
   wherein a status of the access point is changed when the access point loses one of the connections;
   wherein the status of the access point is restored upon confirmation that the access point has not been removed from the physical location, and
   wherein the confirmation comprises comparing an access point identifier, received from the access point, in response to a test call, with a stored access point identifier.

* * * * *